United States Patent
Inoue et al.

(10) Patent No.: US 9,174,194 B2
(45) Date of Patent: Nov. 3, 2015

(54) ADSORBENT CONTAINING CHELATING POLYMER

(71) Applicant: NIPPON FILCON CO., LIMITED, Tokyo (JP)

(72) Inventors: Yoshinori Inoue, Tokyo (JP); Mitsuru Saito, Tokyo (JP); Hideyuki Yanai, Tokyo (JP); Waka Kamichatani, Tokyo (JP)

(73) Assignee: NIPPON FILCON CO., LIMITED, Tokyo (JP)

( * ) Notice: Subject to any disclaimer, the term of this patent is extended or adjusted under 35 U.S.C. 154(b) by 0 days.

(21) Appl. No.: 14/532,633

(22) Filed: Nov. 4, 2014

(65) Prior Publication Data

US 2015/0065617 A1 Mar. 5, 2015

Related U.S. Application Data

(62) Division of application No. 13/265,783, filed as application No. PCT/JP2010/056823 on Apr. 16, 2010.

(30) Foreign Application Priority Data

Apr. 23, 2009 (JP) .................. 2009-104637

(51) Int. Cl.
*B01J 20/26* (2006.01)
*B01J 20/28* (2006.01)
*B01J 20/32* (2006.01)
(Continued)

(52) U.S. Cl.
CPC ............. *B01J 20/265* (2013.01); *B01J 20/261* (2013.01); *B01J 20/262* (2013.01); *B01J 20/28023* (2013.01); *B01J 20/28033* (2013.01);
*B01J 20/321* (2013.01); *B01J 20/328* (2013.01); *B01J 20/3217* (2013.01); *B01J 20/3272* (2013.01); *B01J 45/00* (2013.01); *B01J 47/12* (2013.01); *B01J 47/123* (2013.01); *C02F 1/683* (2013.01); *C08G 73/0206* (2013.01); *C08L 79/02* (2013.01); *D01F 1/10* (2013.01); *D01F 2/08* (2013.01); *D01F 2/30* (2013.01); *D01F 6/50* (2013.01); *D01F 6/54* (2013.01);
(Continued)

(58) Field of Classification Search
CPC ..................... B01J 20/28023; B01J 20/262
See application file for complete search history.

(56) References Cited

U.S. PATENT DOCUMENTS

| | | | | |
|---|---|---|---|---|
| 5,190,660 A | * | 3/1993 | Lindoy et al. | 210/670 |
| 2012/0132852 A1 | * | 5/2012 | Inoue et al. | 252/184 |
| 2014/0332714 A1 | * | 11/2014 | Inoue et al. | 252/180 |

FOREIGN PATENT DOCUMENTS

| | | |
|---|---|---|
| JP | 53-112954 A | * 10/1978 |
| JP | 54-162800 A | * 12/1979 |

(Continued)

*Primary Examiner* — Joseph D Anthony
(74) *Attorney, Agent, or Firm* — Kubovcik & Kubovcik

(57) ABSTRACT

A metal adsorbent which can adsorb a wide variety of metals, can conform to various uses, and adsorbs metals in large amounts. Metal adsorbents in various forms, which have the property of highly efficiently adsorbing metals, are produced by (a) a method in which a polyamine polymer is chemically bonded and immobilized to a porous support, (b) a method in which a polyamine polymer is blended into a solution of a raw material for fibers and the mixture is formed into fibers by wet-spinning or dry spinning, and (c) a method in which a polyamine polymer is blended into a solution of a film-forming polymer and the mixture is formed into a film by a method of film formation from solution.

2 Claims, 22 Drawing Sheets

Comparison of adsorption characteristics for metals at various pHs of sample solutions between a porous metal adsorbent C and a commercially available iminodiacetic acid type chelating resin

| | |
|---|---|
| FIG.1a | Comparison of adsorption characteristic for Cu at each pH |
| FIG.1b | Comparison of adsorption characteristic for Ni at each pH |
| FIG.1c | Comparison of adsorption characteristic for Cd at each pH |
| FIG.1d | Comparison of adsorption characteristic for Pb at each pH |
| FIG.1e | Comparison of adsorption characteristic for Mg at each pH |
| FIG.1f | Comparison of adsorption characteristic for Ca at each pH |
| FIG.1g | Comparison of adsorption characteristic for Cr(III) at each pH |
| FIG.1h | Comparison of adsorption characteristic for Mo at each pH |
| FIG.1i | Comparison of adsorption characteristic for V at each pH |
| FIG.1j | Comparison of adsorption characteristic for As(V) at each pH |

(51) Int. Cl.
*B01J 45/00* (2006.01)
*B01J 47/12* (2006.01)
*C02F 1/68* (2006.01)
*C08G 73/02* (2006.01)
*C08L 79/02* (2006.01)
*D01F 1/10* (2006.01)
*D01F 2/08* (2006.01)
*D01F 2/30* (2006.01)
*D01F 6/50* (2006.01)
*D01F 6/54* (2006.01)
*D01F 6/94* (2006.01)
*C02F 101/20* (2006.01)

(52) U.S. Cl.
CPC ............ *D01F 6/94* (2013.01); *B01J 2220/445* (2013.01); *C02F 2101/20* (2013.01)

(56) References Cited

FOREIGN PATENT DOCUMENTS

| | | | |
|---|---|---|---|
| JP | 62-184113 A | * | 8/1987 |
| JP | 2005-021883 A | * | 1/2005 |
| JP | 2005-213477 A | * | 8/2005 |

* cited by examiner

FIG. 1

Comparison of adsorption characteristics for metals at various pHs of sample solutions between a porous metal adsorbent C and a commercially available iminodiacetic acid type chelating resin

| FIG.1a | Comparison of adsorption characteristic for Cu at each pH |
| --- | --- |
| FIG.1b | Comparison of adsorption characteristic for Ni at each pH |
| FIG.1c | Comparison of adsorption characteristic for Cd at each pH |
| FIG.1d | Comparison of adsorption characteristic for Pb at each pH |
| FIG.1e | Comparison of adsorption characteristic for Mg at each pH |
| FIG.1f | Comparison of adsorption characteristic for Ca at each pH |
| FIG.1g | Comparison of adsorption characteristic for Cr(III) at each pH |
| FIG.1h | Comparison of adsorption characteristic for Mo at each pH |
| FIG.1i | Comparison of adsorption characteristic for V at each pH |
| FIG.1j | Comparison of adsorption characteristic for As(V) at each pH |

FIG. 2

Comparison of adsorption characteristics for metals at various pHs of sample solutions between a porous metal adsorbent D and a commercially available iminodiacetic acid type chelating resin

| FIG. 2 a | Comparison of adsorption characteristic for Cu at each pH |
| --- | --- |
| FIG. 2 b | Comparison of adsorption characteristic for Ni at each pH |
| FIG. 2 c | Comparison of adsorption characteristic for Cd at each pH |
| FIG. 2 d | Comparison of adsorption characteristic for Pb at each pH |
| FIG. 2 e | Comparison of adsorption characteristic for Mg at each pH |
| FIG. 2 f | Comparison of adsorption characteristic for Ca at each pH |
| FIG. 2 g | Comparison of adsorption characteristic for Cr(III) at each pH |
| FIG. 2 h | Comparison of adsorption characteristic for Mo at each pH |
| FIG. 2 i | Comparison of adsorption characteristic for V at each pH |
| FIG. 2 j | Comparison of adsorption characteristic for As(V) at each pH |

ADSORBENT CONTAINING CHELATING POLYMER

TECHNICAL FIELD

The present invention relates to a metal adsorbent used for removal/collection of a wide variety of heavy metals in treated solutions such as industrial wastewater, service water and environmental water.

BACKGROUND ART

Chelating resins are used as adsorbents/collectors of heavy metal elements in a solution containing a high-concentration salt, which are difficult to adsorb and collect with ion exchange resins. As the ability of forming a complex with metal elements varies depending on the structure of functional groups, chelating resins having various functional groups such as an iminodiasetic acid (IDA) group, a low-molecular polyamine group, aminophosphoric acid group, an isothionium group, a dithiocarbamic acid group and a glucamine group are commercially available. Among them, chelating resins introducing an IDA group are mainly used, but chelating resins introducing a low-molecular polyamine group are used for removing metals from a solution containing a large amount of alkali metals and alkali earth metals. These chelating resins form a complex with many metals, but the stability constant of a complex formed is significantly low as compared to ethylenediamine tetraacetic acid (EDTA), a typical chelating agent, and there arises a disadvantage that metal removal and collection rates are subject to variation due to interference by contaminant ions if the concentration of those contaminant ions in a treated solution is high.

It is known that in polyaminocarboxylic acid type chelating agents such as IDA and EDTA, the greater the number of repetitions of ethyleneimine is (the greater the chain length is), the higher the stability constant of the complex is (see Non Patent Document 1 and Non Patent Document 2). There is disclosed a chelating resin having an aminocarboxylic acid type functional group with increased chain length. Patent Document 1 discloses a linear diethylenetriamine-N,N,N', N''-tetraacetic acid type prepared by introducing diethylenetriamine into a base resin at terminal nitrogen, followed by carboxy-methylation. Here, a triethylenetetramine type functional group is described together with the diethylenetriamine type, but in examples in Patent Document 2, there are many obscure matters, the metal adsorption capacity is not significantly high, and effects based on the chain length are not made clear.

It is estimated that by further increasing the chain length of the functional group, the stability constant of the complex is improved, and a plurality of metals can also be adsorbed in one molecule. As an example of immobilization of a long chain functional group, Patent Document 2 discloses a high-molecule type chelating resin having a quaternary ammonium group in which polyethyleneimine is introduced into a tertiary amino group type anion exchange resin. This disclosed example indicates that an epoxy group or aldehyde group is introduced into a tertiary amino group of a weak anion exchange resin, followed by reacting polyethyleneimine with the remaining epoxy group or aldehyde group. It is indicated that the chelating resin thus prepared is effective in removal of metals from an organic solvent. However, this introduction reaction is not a quantitative reaction, and therefore the amount of functional group introduced is considered low, thus making it difficult to prepare a chelating resin having a high metal adsorption capacity.

On the other hand, there is also a problem regarding a form as an adsorbent. The chelating resin is a particulate adsorbent like activated carbon and ion exchange resin, and is used in a wide range of areas such as wastewater treatment and water purification. Water treatment techniques using the particulate adsorbents have been already established, and are believed to be frequently used in the future. However, they must be filled in a specific vessel or tank before being used because of their particulate forms, and may be hard to be applied depending on working conditions and installation environment. That is, for meeting a variety of requests, an adsorbent not only having adsorption characteristics as an adsorbent but also being capable of matching a wide variety of forms including particulate forms is required.

For these problems, a fiber-type chelating adsorbent capable of being easily processed into various forms and meeting a variety of requests has been proposed. Patent Document 3 discloses fibers introducing a chelating functional group by chemical grafting, Patent Documents 4 and 5 disclose fibers introducing a chelating functional group by radical generation/graft polymerization by radiation irradiation, and Patent Document 6 discloses fibers by a method of injecting a low-molecule chelating agent under a high temperature and high pressure. These chelating fibers are believed to have sufficient functions and exhibit quick adsorption characteristics, but have problems in terms of production. Chemical grafting limits the kinds of fibers capable of being grafted and complicates production steps. Radiation grafting has an advantage of being applicable to various fibers as compared to chemical grafting, but requires operations under a specific environment due to handling of radiations, and therefore cannot be considered as a convenient and inexpensive production process. Furthermore, the method of injection/impregnation of a chelating agent has an advantage of allowing various fibers to be used, but is not necessarily a convenient production process because a supercritical fluid such as carbon dioxide is most effective under disclosed conditions and pressure conditions are represented by a very high pressure of 100 atm. ($9.8 \times 10^6$ Pa)-250 atm. ($2.45 \times 10^7$ Pa).

CITATION LIST

Patent Document

Patent Document 1: Japanese Unexamined Patent Application Publication No. 2005-213477
Patent Document 2: Japanese Unexamined Patent Application Publication No. 2005-21883
Patent Document 3: Japanese Unexamined Patent Application Publication No. 2001-113272
Patent Document 4: Japanese Patent No. 4119966
Patent Document 5: Japanese Patent No. 3247704
Patent Document 6: Japanese Unexamined Patent Application Publication No. 2007-247104

Non-Patent Document

Non-Patent Document 1: DOJINDO LABORATORIES Catalog 26th Ed., p. 320-321.
Non-Patent Document 2: L. G. Sillen, A. E. Martell, Stability Constants of Metal-Ion Complexes 2nd Ed., the Chemical Society, London (1964).

SUMMARY OF THE INVENTION

Problems to be Solved by the Invention

The present invention has been made in view of the above-mentioned problems, and has as its object provision of a metal adsorbent which comprises a polyamine polymer, namely polyethyleneimine or partially carboxy-methylated product thereof, can meet a variety of requests and exhibits a high metal adsorption ability.

Means to Solve the Problems

The present invention has been completed on the basis of the finding that a metal adsorbent wherein a polyamine polymer which has repeating units of ethyleneimine and N-carboxy-methylated ethyleneimine represented by the following formula (1) in the polymer chain and in which the average molecular weight of polyethyleneimine forming a chain frame is 600 to 150,000 is immobilized or held on an appropriate support as a metal adsorbent functional group exhibits a high metal adsorption ability and can meet a variety of requests.

[Chemical Formula 1]

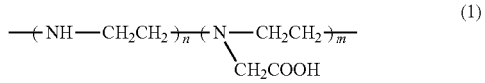

wherein n represents a positive integer and m represents a positive integer including 0.

In the present invention, the metal adsorbent comprising a polyamine polymer represented by the aforementioned formula (1) is in a porous, fiber-type or film-type form as described in the following items (i) to (iii):

(i) a metal adsorbent having a form in which polyamine polymer is reacted with a porous support having a functional group reactive with an imino group and immobilized on the porous support;

(ii) a metal adsorbent having a form in which a polyamine polymer is introduced into a solution of a raw material for fibers and the mixture is formed into fibers by wet spinning or dry spinning; and (iii) a metal adsorbent having a form in which a polyamine polymer is dissolved in a film-forming polymer solution and the solution is formed into a film using a method of film formation from solution.

The porous supports having a functional group reactive with an imino group include, for example, a porous polymer support having any of a halogenated alkyl group, an epoxy group and an aldehyde group, any of porous glass, porous silica or porous ceramic introducing a silane compound having an epoxy group, and porous sintered glass introducing a silane compound having an epoxy group.

The porous polymer support is produced by a well-known method such as copolymerization of a vinyl monomer having a group such as a halogenated alkyl group or an epoxy group and a cross-linkable monomer having two or more vinyl groups in the presence of a solvent not contributing to a polymerization reaction (pore generation reagent), for example, suspension polymerization or aggregated polymerization. The pore size reagent is required for producing macro-pore and increasing the specific surface area of polymer particle, can be adjusted by the type and amount of pore generation reagent. The pore generation reagent is selected as appropriate according to the properties of a monomer used. As the pore generation reagent, aromatic hydrocarbons such as toluene and xylene, esters such as butyl acetate and dim-ethyl phthalate, insoluble alcohols such as amyl alcohol and octyl alcohol, and paraffin such as octane or dodecane are generally used.

The raw material for fibers used when a polyamine polymer is mixed into a solution of the raw material for fibers and the mixture is formed into fibers by blend-spinning by wet spinning or dry spinning is cellulose or vinylon, and the raw material for fibers used for dry blend-spinning is cellulose acetate, vinylon, acryl or urethane.

The polyamine polymer is soluble in water and a mixed solution of water and a polar solvent as well, and therefore can be put as a powder into a solution of a raw material for fibers and dissolved therein. A fiber-type metal adsorbent can be formed by dissolving the polyamine polymer in an appropriate solvent, for example an aqueous alkali solution beforehand, then blending the solution into a solution of a raw material for fibers for wet blend-spinning and then subjecting the mixture to wet spinning, or a fiber-type metal adsorbent can be formed by dissolving the polyamine polymer directly in a solution of a raw material for fibers and then subjecting the solution to wet spinning.

Furthermore, the polyamine polymer is soluble in organic solvents such as various kinds of alcohols, acetone, dimethylformamide, dimethylacetoamide and dimethylsulfoxide, and therefore a fiber-type metal adsorbent can be formed by dissolving the polyamine polymer in such an appropriate solvent, then blending the solution into a solution of a raw material for fibers and then subjecting the mixture to dry spinning, or a fiber-type metal adsorbent can be formed by dissolving the polyamine polymer directly in a solution of a raw material for fibers and subjecting the solution to dry spinning.

It is desirable that the ratio of the polyamine polymer blended into the raw material for fibers is 1 to 30% by weight, preferably 1 to 20% by weight based on the fiber components in consideration of the metal adsorption capacity of the resulting fiber-type metal adsorbent, the properties of the solution of the raw material for fibers after blending of the polyamine polymer and effects on the spinning characteristic.

When the polyamine polymer is dissolved in a film-forming polymer solution and the solution is formed into a film-type (filmy or sheeted) metal adsorbent using a method of film formation from solution, cellulose acetate, vinylon, acryl or urethane is used as the film-forming polymer.

The polyamine polymer is dissolved in a film-forming polymer solution, and the solution is casted to a desired thickness by a method of film formation from solution, followed by distilling away the solvent to form a film-type metal adsorbent.

More detailed technical matters for what are described above are further added into "Detailed Description of the Preferred Embodiments".

Advantages of the Invention

According to the present invention, with a polyamine polymer having in the molecule many functional groups capable of forming a complex with a metal, a metal adsorbent having a high metal adsorption ability and being capable of meeting a variety of requests is produced by a) a method in which the polyamine polymer is reacted with a porous support having a functional group reactive with an imino group and immobilized on the porous support, b) a method in which the polyamine polymer is blended into a solution of a raw material for fibers and the mixture is formed into fibers by blend-spinning by wet spinning or dry spinning, or c) a method in which the polyamine polymer is dissolved into a film-forming polymer solution and the solution is formed into a film using a method of film formation from solution. Moreover, the fiber-type or film-type metal adsorbent does not have the polyamine polymer detached from the metal adsorbent to deteriorate its performance when used.

BRIEF DESCRIPTION OF THE DRAWINGS

FIG. 1 is a graph showing a comparison of adsorption characteristics for metals at various pHs of sample solutions between a metal adsorbent C of the present invention and a commercially available iminodiacetic acid type chelating resin.

FIG. 2 is a graph showing a comparison of adsorption characteristics for metals at various pHs of sample solutions between a fiber-type metal adsorbent D of the present invention and a commercially available iminodiacetic acid type chelating resin.

DETAILED DESCRIPTION OF THE PREFERRED EMBODIMENTS

Figure 1A:
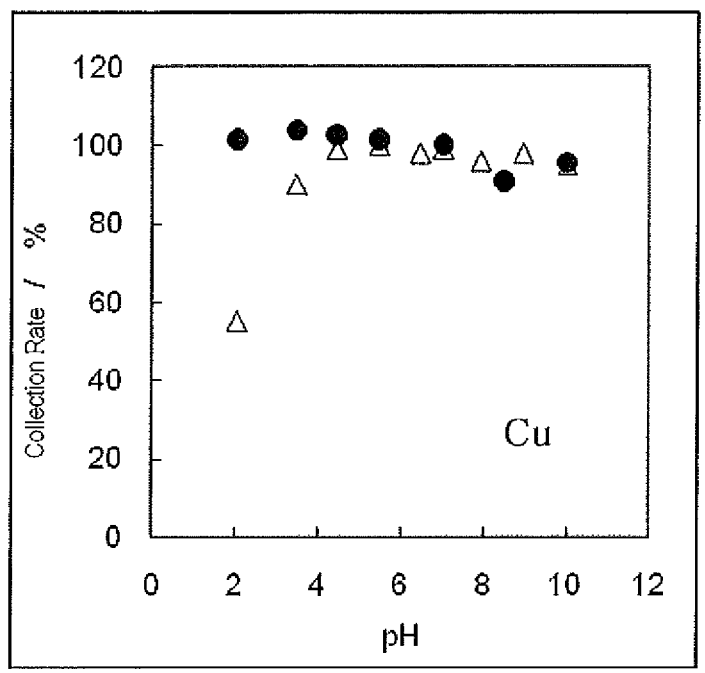
FIG. 1a shows a comparison of adsorption characteristics for copper Cu at each pH.

The present invention is a metal adsorbent exhibiting a high metal adsorption ability, wherein a polyamine polymer which has repeating units of ethyleneimine and N-carboxy-methylated ethyleneimine represented by the following chemical formula (1) in the polymer chain and in which the average molecular weight of polyethyleneimine forming a chain frame is 600 to 150,000 is immobilized or held on an appropriate support as a metal adsorbent functional group.

[Chemical Formula 1]

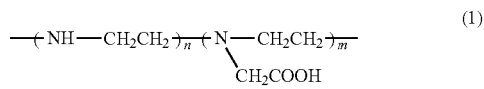

wherein n represents a positive integer and m represents a positive integer including 0.

The basic chain frame of a polyamine polymer for use in the present invention is polyethyleneimine. Polyethyleneimine produced by a well-known method such as ring-opening polymerization of ethyleneimine and polycondensation of ethylene chloride and ethylenediamine can be used. Normally, polyethyleneimine has intermixed structures of primary, secondary and tertiary amines as shown in the following chemical formula (2) in addition to a linear structure. In the present invention, the polyethyleneimine may include structure units of primary to tertiary amines in any ratio, and is collectively called polyethyleneimine. In the present invention, a high-molecular weight polyamine polymer is used. The advantage of a polyamine polymer having a chain frame of polyethyleneimine having a high molecular weight is that not only the stability constant of a formed complex increases with increase in the chain length of polyethyleneimine, but also a large number of metals are adsorbed in the molecular chain of the polyamine polymer. Further, it is estimated that the adsorption rate is enhanced as the polymer chain of the polyamine polymer extends in a treated solution to increase a degree of freedom.

On the other hand, a metal adsorbent comprising a polyamine polymer having a chain frame of low-molecular polyamine is not an adsorbent with good adsorption efficiency and a high metal adsorption capacity. In a fiber-type or film-type metal adsorbent, low-molecular polyamine held may be eluted to deteriorate the function when used. Conversely, if the molecular weight is too large, there arises a disadvantage that the solution viscosity becomes so high that carboxy-methylation, immobilization reaction into a support or the like does not evenly proceed or that an increase in solution viscosity or gelation during spinning or film formation occurs, resulting in nonhomogenous products. Therefore, polyethyleneimine having a molecular weight of 600 to 150,000, preferably 600 to 100,000 is used. In addition, even a fiber-type or film-type metal adsorbent does not have the polyamine polymer detached to deteriorate the performance when used, and therefore retains the performance permanently.

[Chemical Formula 2]

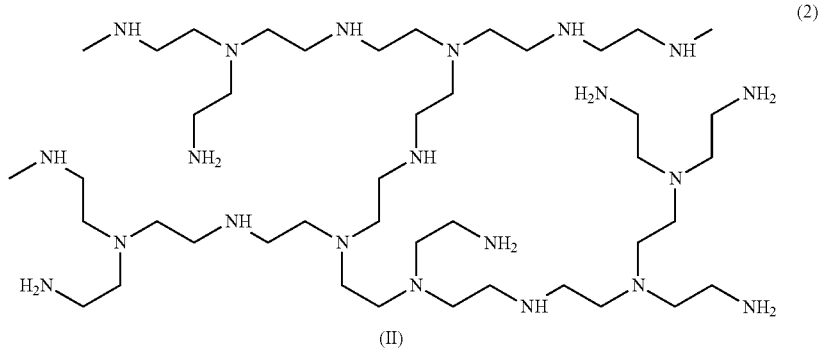

(2)

(II)

For producing a polyamine polymer according to the present invention, partial carboxy-methylation of polyethyleneimine is performed. In the present invention, the carboxymethyl group is not introduced into all the nitrogen of polyethyleneimine, and the polyamine polymer has a structure in which secondary amino groups (imino groups) and tertiary amino groups remain as shown in the following chemical formula (3). The polyamine polymer may be introduced on various supports using remaining secondary amino groups. Furthermore, since secondary amine groups remain, the polyamine polymer shows a behavior similar to that of a low-molecular polyamine type chelating resin and is insusceptible to interference by alkali metals and alkali earth metals. The degree of partial carboxy-methylation of polyethyleneimine is adjusted by adjustment of conditions for carboxy-methylation. Carboxy-methylation of polyethyleneimine is performed by a well-known method. Namely, polyethyleneimine is reacted with halogenated acetic acid such as chloroacetic acid or bromoacetic acid in an alkali solution such as 0.5 to 2M sodium hydroxide or potassium hydroxide and further sodium carbonate. Here, using 0.1 to 4 times (as mole) of halogenated acetic acid based on the nitrogen content in polyethyleneimine, carboxy-methylation is performed. If the amount of halogenated acetic acid is greater than 4 times (as mole), most of the nitrogen in polyethyleneimine is carboxymethylated. If the degree of carboxy-methylation increases, heavy metals can be adsorbed in a wide range of pHs, but adsorptivity for alkali metals and alkali earth metals also increases. Therefore, when metals in a solution in which those metals coexist in a large amount are to be removed and collected, the collection rate of intended heavy metals decreases due to interference by these metals. In this connection, in the present invention, partial carboxy-methylation may be performed after introduction of polyethyleneimine into a support.

[Chemical Formula 3]

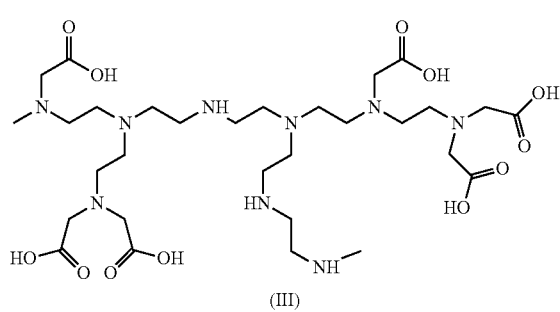

(3)

(III)

The polyamine polymer itself having a large number of chelating functional groups in the molecule according to the present invention can be used as a solution metal adsorbent, but is difficult to separate from a treated solution because of its high water solubility. Therefore, the polyamine polymer is modified into a form which is easily handled by a) a method in which the polyamine polymer is reacted with a porous support having a functional group reactive with an imino group and introduced on the porous support, b) a method in which the polyamine polymer is mixed into a solution of a raw material for fibers and the mixture is formed into fibers by blend-spinning by dry spinning or wet spinning, or c) a method in which the polyamine polymer is dissolved into a film forming polymer solution and the mixture is formed into a film using a method of film formation from solution.

In the present invention, when a polyamine polymer having a large number of chelating functional groups in the molecule is immobilized on a porous support by chemical introduction to form a porous metal adsorbent, the porous support having a functional group reactive with an imino group may be either an organic polymer or an inorganic material.

As an organic polymer porous support, an insoluble polymer having a functional group capable of reacting with an amino group or an imino group, such as a halogenated alkyl group, an epoxy group, an aldehyde group, a ketone group, an acyl chloride group and an acid anhydride group. However, when an aldehyde group or a ketone group is used, reduction by a well-known method using $LiBH_3CN$, $NaBH_3CN$, $(CH_3)_2NHBH_3$ or the like is required to be performed for improving the chemical resistance. When an acyl chloride group or an acid anhydride group is used, an immobilization reaction in a nonaqueous system is required. Therefore, a polymer porous support having a halogenated alkyl group or epoxy group is preferable when considering easy of reaction and workability. Such a polymer porous support can be obtained by well-known aggregated polymerization or well-known suspension polymerization. Furthermore, the porous support may be a porous support prepared by producing a support of crosslinked polystyrene, crosslinked polymethacrylate, crosslinked polyvinyl alcohol or the like obtained by a well-known method and further introducing into the support a functional group reactive with an imino group.

The polymer porous support having a halogenated alkyl group or an epoxy group is produced by copolymerization of a vinyl monomer having a group such as a halogenated alkyl group or an epoxy group and a cross-linkable monomer having two or more vinyl groups and being capable of copolymerization. Vinyl monomers having an epoxy group include, for example, glycidyl methacrylate, glycidyl acrylate and vinylbenzyl glycidyl ether.

Vinyl monomers having a halogenated alkyl group include, for example, chloromethylstyrene, 3-chloro-2-hydroxypropyl methacrylate, 3-chloro-2-hydroxypropyl acrylate, 2-chloroethyl methacrylate and 2-chloroethyl acrylate. Furthermore, cross-linkable monomers having two or more vinyl groups include aromatic cross-linkable monomers such as divinylbenzene and divinylnaphthalene, polyfunctional methacrylate monomers such as ethylene dimethacrylate, diethyleneglycol dimethacrylate, glycerine dimethacrylate, trimethylolpropane trimethacrylate and neopentylglycol trimethacrylate, polyfunctional acrylate monomers such as ethylene diacrylate, diethyleneglycol diacrylate, glycerine diacrylate, trimethylolpropane triacrylate, neopentylglycol triacrylate, pentaerythritol triacrylate and pentaerythritol tetraacrylate, and also cross-linkable monomers having a cyanuric acid structure, such as triallyl isocyanurate and trimethaallyl isocyanurate.

Copolymerization of these reactive monomers and cross-linkable monomers is performed well-known suspension polymerization to obtain an insoluble polymer support having a reactive functional group. An insoluble polymer support having a reactive functional group may be obtained by other polymerization methods, for example, aggregated polymerization as required.

During copolymerization, a solvent (pore generation reagent) which is compatible with these monomers and does not contribute to a polymerization reaction is added to impart porosity to the polymer support. The porosity of the polymer porous support is not specifically limited, but a polymer porous support having a pore volume of 0.3 to 2.0 mL/g, an average pore size of 6 to 50 nm and a specific surface area of 10 to 1,000 m$^2$/g is preferably employed for immobilizing the polyamine polymer of the present invention to a high degree. Furthermore, the form of the polymer support is not specifically defined, and may be irregular particles by crush of a resin obtained by well-known aggregated polymerization or spherical particles obtained by well-known suspension polymerization.

The amount of polyamine polymer immobilized as a chelating functional group depends on the amount of reactive functional group in the polymer porous support. The amount of reactive functional group is a compounding ratio of the reactive monomer during copolymerization, and can be freely changed according to the intended metal adsorbent, but as the compounding ratio of the cross-linkable monomer decreases, the support becomes softer and the degree of swelling/shrinking increases. For performing a metal adsorption treatment at a high flow rate, a hard adsorbent having a reduced degree of swelling/shrinking is preferable, and therefore the degree of crosslinking represented by the following formula 1 is 10% or greater, preferably 20% or greater. Therefore, the compounding ratio of the reactive monomer is 10 to 90%, preferably 15 to 80%. Furthermore, a third monomer can also be added for changing the characteristics of the polymer porous support, for example, wettability and hydrophobicity.

[Formula 1]

$$\text{Degree of crosslinking (wt \%)} = \frac{\text{weight of cross-linkable monomer }(g)}{\text{weight of cross-linkable monomer }(g) + \text{weight of vinyl monomer }(g)} \times 100 \quad \text{Formula 1}$$

The reaction of a polymer porous support having a functional group reactive with an imino group and a polyamine polymer is carried out under stirring at room temperature to 80° C. for 3 to 24 hours with the polymer porous support having reactive functional group dispersed in a solution of the polyamine polymer in water, alcohol, dimethylformamide or the like or a mixed solvent thereof. At this time, primary to tertiary amines in the polyamine polymer of the present invention reacts with the halogenated alkyl group or epoxy group in the polymer porous support to introduce the polyamine polymer onto the surface of the polymer porous support. By washing with water and an organic solvent after completion of the reaction, and subsequent drying, a porous metal adsorbent holding a polyamine polymer is obtained. Generally, in the case of a high-molecular polymer porous support, partial carboxy-methylation can also be carried out after immobilization of polyethyleneimine because of its high alkali resistance. In the case of a polymer porous support using an acrylate monomer, however, decomposition of an ester moiety may occur under a strong alkali, and therefore it is not preferable to carry out partial carboxy-methylation under strong alkali conditions after immobilization of polyethyleneimine.

As an inorganic porous support into which a polyamine polymer is immobilized, porous glass, porous silica or porous ceramic is used. The porosity of the inorganic porous support is not specifically limited, but an inorganic porous support having a pore volume of 0.3 to 2.0 mL/g, an average pore size of 6 to 50 nm and a specific surface area of 10 to 1,000 m$^2$/g is preferably employed for immobilizing the polyamine polymer of the present invention to a high degree. Furthermore, the form of the inorganic porous support is not specifically defined, and may be irregular particles or spherical particles.

A metal adsorbent may also be obtained by impregnating the inorganic porous support with the polyamine polymer and holding the same by adsorption, but the polyamine polymer is detached from the support depending on service conditions. Therefore, the surfaces of these inorganic porous supports are treated with a silane compound having an epoxy group, followed by chemically introducing the polyamine polymer. Typical examples of silane compounds having an epoxy group include γ-glycidoxypropyltrimethoxysilane, and an epoxy group can be introduced into a silanol group on the surface of glass or silica gel or a hydroxide group of ceramic by a well-known method. Introduction of the polyamine polymer into an epoxy group is performed in a manner same as that of introducing the polyamine polymer into the polymer porous support. Namely, an inorganic porous support introducing an epoxy group is put in a solution of the polyamine polymer in water, alcohol, dimethylformamide or the like or a mixed solvent thereof, and a reaction is carried out under stirring at room temperature to 80° C. for 3 to 24 hours. By washing with water and an organic solvent after completion of the reaction, and subsequent drying, a porous metal adsorbent holding a polyamine polymer as a metal adsorbing functional group is obtained. However, when porous silica gel is used as a support, partial carboxy-methylation cannot be performed under alkali conditions after introduction of polyethyleneimine because of its low alkali resistance.

In the present invention, a polyamine polymer having a large number of chelating functional groups in the molecule is mixed with a solution of a raw material for fibers, and the mixture is formed into a fiber-type metal adsorbent by blend-spinning. As a method of blend-spinning, either wet spinning or dry spinning may be used.

In wet spinning of the present invention, blend-spinning with cellulose (rayon), i.e. regenerated fibers or vinylon is performed. In the case of rayon, any of a viscose method or a copper-ammonia method can be used to produce a fiber-type metal adsorbent, but when the copper-ammonium method is used, not only copper may be adsorbed to the polyamine polymer to cause thickening/aggregation resulting in degradation of spinning characteristics, but also an additional washing step is required for removing copper after spinning. Therefore, the viscose method is preferably used when a fiber-type metal adsorbent is produced. When blend-spinning is carried out using the viscose method, a well-known method for production viscose rayon may be used. Namely, the metal adsorbent is produced by 1) a step of preparing a polyamine polymer, 2) a step of preparing cellulose viscose produced by a well-known method, 3) a step of closely mixing the polyamine polymer with cellulose viscose, 4) a step of squeezing out the solution through a spinning nozzle, 5) a step of allowing regeneration in a coagulating bath having diluted sulfuric acid as a main agent, and 6) a step of washing and drying spun fibers. In the case of blend-spinning with vinylon, well-known gel spinning may be used, and blend-spinning may be carried out by the same steps. In this connection, the polyamine polymer of the present invention is water-soluble, and also soluble in a mixed solution with a polar solvent, and therefore can be inputted as a powder in a solution of a raw material for fibers and dissolved therein. When considering workability, it is easier in terms of production to dissolve the polyamine polymer in an appropriate solvent, for example, an aqueous alkali solution, followed by blending the solution into a solution of a raw material for fibers.

In dry spinning of the invention, blend-spinning with cellulose acetate, vinylon, acryl, urethane or the like is carried out. When blend-spinning is carried out using dry spinning, a well-known method of dry spinning may be used. Namely, the metal adsorbent is produced via 1) a step of preparing a polyamine polymer, 2) a step of preparing a raw material for fibers dissolved in a solvent by a well-known method, 3) a step of closely mixing the polyamine polymer with the raw material for fibers, 4) a step of squeezing out the solution through a spinning nozzle, and 5) a step of removing the solvent to form fibers. In this connection, the polyamine polymer of the present invention is soluble in organic solvents such as various kinds of alcohols, acetone, dimethylformamide, dimethylacetoamide and dimethylsulfoxide, and therefore can be added as a powder to a solution of a raw material for fibers and dissolved therein, but it is easier in terms of production steps to dissolve the polyamine polymer in an appropriate solvent, followed by blending the solution into a solution of a raw material for fibers.

In the present invention, it is desirable that the ratio of the polyamine polymer blended into a raw material for fibers is 1 to 30% by weight, preferably 1 to 20% by weight in consideration of the metal adsorption capacity of the fiber-type metal adsorbent, the properties of the solution of the raw material for fibers after blend of the polyamine polymer and effects on the spinning characteristic. Blend at a high concentration is also possible depending on the properties of fibers prepared by blend-spinning, but in general, if the ratio is greater than 30% by weight, the metal adsorption capacity increases, but there may arise disadvantages that thickening/aggregation of the solution of a raw material for fibers occurs to degrade the spinning characteristic, and further the mechanical strength of the resulting fibers decreases, and so on.

In the present invention, a specific polyamine polymer is dissolved into a film-forming polymer solution, and the mixture can be formed into a film-type (filmy, sheeted) metal adsorbent using a method of film formation from solution.

In film formation according to the present invention, the aforementioned technique of wet spinning or dry spinning can be applied, but a general method of film formation from solution can also be used. Polymers as a base material for use in the method of film formation from solution include cellulose acetate, vinylon, acryl or urethane. The methods of film formation include various well-known methods of film formation from solution such as a method of solution casting film formation. The specific polyamine polymer of the present invention is soluble in aqueous acid and alkali solutions as well as organic solvents such as various kinds of alcohols, acetone, dimethylformamide, dimethylacetoamide and dimethylsulfoxide, and therefore an appropriate solvent may be selected in accordance with the solubility of a polymer as a film base material, conditions for distilling away a solvent during film formation, and the like. Namely, a film-type metal adsorbent having a desired thickness can be produced via 1) a step of preparing a specific polyamine polymer of the present invention, 2) a step of preparing a solution of a film base material polymer dissolved in an appropriate solvent by a well-known method, 3) a step of closely blending the specific polyamine polymer with the film base material polymer solution, 4) a step of casting the solution to a desired thickness, and 5) a step of removing the solvent to form a film.

As described above, by using as a metal adsorbing functional group a polyamine polymer having repeating units of ethyleneimine and N-carboxy-methylated ethyleneimine, a metal adsorbent exhibiting a high metal adsorption ability can be obtained. Furthermore, a wide variety of forms of metal adsorbents can be produced by a) a method in which the polyamine polymer of the present invention is reacted with a porous support having a functional group reactive with an imino group and immobilized on the porous support, b) a method in which the polyamine polymer is blended into a solution of a raw material for fibers and the mixture is formed into fibers by blend-spinning by wet spinning or dry spinning, and c) a method in which the polyamine polymer is dissolved into a film-forming polymer solution and the mixture is formed into a film using a method of film formation from solution.

In this connection, conditions for adsorbing and removing heavy metals in an aqueous solution using the metal adsorbent of the present invention are not limited by the description of the present invention, but if the main purpose is adsorption of copper, lead, cadmium and the like, those metals can be efficiently adsorbed by adjusting the pH of a treated solution to 3 to 7, preferably 4 to 6. The range of pH for optimum adsorption varies depending on metals, and therefore can be applied to adsorption of various metals by adjusting the pH range in accordance with the adsorption characteristics of metals intended to be adsorbed and removed. Moreover, when the metal adsorbent to which heavy metals have been adsorbed as described above is treated with an acidic aqueous solution such as nitric acid or hydrochloric acid, heavy metals adsorbed by formation of chelates are quickly detached, and therefore adsorbed heavy metals can be collected with high efficiency and the metal adsorbent can be regenerated.

Next, the present invention will now be described with examples, but the present invention is not in any way limited by these examples.

Example 1

Production of Porous Metal Adsorbent A

A mixed monomer solution with 30 g of chloromethylstyrene, 170 g of divinyl benzene, 140 g of toluene and 60 g of lauryl alcohol containing 2 g of 2,2'-azobisisobutyronitrile as a catalyst was added into 2,000 mL of 0.1% aqueous polyvinyl alcohol (polymerization degree 500) solution, the mixture was stirred by a propeller blade stirrer so that the oil droplet size was 60 μm, and a polymerization reaction was carried out at 70° C. for 6 hours. After the reaction, copolymerized particles thus produced were taken by filtration, and washed with water and then methanol. Then, the particles were air-dried for a day, and then classified to obtain 75 g of polymer porous support of 45 to 90 μm. The specific surface area, pore volume and average pore size of this porous support were measured by Beckman Coulter SA3100 Surface Area Analyzer and found to be 690 $m^2/g$, 0.89 mL/g and 9.9 nm, respectively. Then, 40 g of polyethyleneimine (manufactured by Wako Pure Chemical Industries, Ltd.) having a average molecular weight of 600 was dissolved in a mixed solution of 40 mL of isopropyl alcohol and 160 mL of water, 20 g of obtained polymer porous support were then added to the solution, and the mixture was reacted at 50° C. for 6 hours. The reaction product was filtered, washed with water and then methanol and dried to produce a porous metal adsorbent A.

Example 2

Production of Porous Metal Adsorbent B 27 g of sodium monochloroacetate was dissolved in a solution prepared by mixing 40 mL of isopropyl alcohol with 160 mL of 0.5 M sodium hydroxide, 40 g of polyethyleneimine same as that in example 1 were further dissolved, and the solution was reacted at 40° C. for 3 hours. The amount of sodium monochloroacetate was 0.25 times (as mole) based on the nitrogen content of polyethyleneimine. Thereafter, 20 g of polymer porous support same as that in example 1 was added, and the mixture was reacted at 50° C. for 6 hours to immobilize N-carboxy-methylated polyethyleneimine on the polymer porous support. After completion of the reaction, the reaction product was filtered, washed with water and then methanol and dried to produce a porous metal adsorbent B.

Comparative Example 1

Production of Porous Metal Adsorbent a 10.5 g of sodium monochloroacetate was dissolved in a solution prepared by mixing 40 mL of isopropyl alcohol with 160 mL of 0.5 M sodium hydroxide, 15.5 g of pentaethylenehexamine (manufactured by Wako Pure Chemical Industries, Ltd.) was further dissolved, and the solution was reacted at 40° C. for 3 hours to carry out N-carboxy-methylation of pentaethylenehexamine. The amount of sodium monochloroacetate was 0.25 times (as mole) based on the nitrogen content of pentaethylenehexamine. Thereafter, 20 g of polymer porous support same as that produced in example 1 was added into the reaction mixture, and the mixture was reacted at 50° C. for hours to react the polymer porous support with carboxy-methylated pentaethylenehexamine. The reaction product was filtered, washed with water and then methanol and dried to produce a porous metal adsorbent a.

Metal Adsorption Test 1

Comparison of Metal Adsorption Capacity

Three porous metal adsorbents obtained in example 1, example 2 and comparative example 1 were dried in a vacuum drier at 60° C. for 3 hours, 250 mg of adsorbent was then separately taken and filled in a syringe type reservoir having a filter with a pore size of 20 μm inserted in the lower part, and further a filter with a pore size of 20 μm was inserted in the upper part to prepare three reservoirs filled with metal adsorbents. 10 mL of each of acetonitrile, pure water, 3 M nitric acid, pure water and then a 0.1 M ammonium acetate buffer (pH 5) were passed through each reservoir to condition the metal adsorbent in the reservoir. Thereafter, 3 mL of 0.5 M copper sulfate solution conditioned with 0.05 M ammonium acetate buffer (pH 5) was slowly passed to adequately adsorb copper to the filled metal adsorbent. Thereafter, the metal adsorbent was washed with 10 mL of pure water and 5 mL of 0.005 M nitric acid, copper adsorbed on the metal adsorbent was then eluted with 3 mL of 3 M nitric acid, the eluent was fixed to the volume of 10 mL, the absorbance of copper was measured at 805 nm by an absorptiometer to determine the copper adsorption capacity in the metal adsorbent. The results are shown in Table 1. The porous metal adsorbent having the polyamine polymer of the present invention as a chelating functional group exhibits a metal adsorption capacity which is 2.5 times as large as that of the metal adsorbent having a functional group with reduced chain length.

TABLE 1

Comparison of metal adsorption capacity in porous metal adsorbent

| | Example 1 | Example 2 | Comparative example 1 |
|---|---|---|---|
| Porous metal adsorbent | porous metal adsorbent A | porous metal adsorbent B | porous metal adsorbent a |
| Metal adsorption capacity [mmol Cu/g] | 0.50 | 0.52 | 0.20 |

Example 3

Production of Porous Metal Adsorbent C

A mixture of 80 g of glycidyl methacrylate, 120 g of ethylene dimethacrylate, 200 g of butyl acetate and 2 g of 2,2'-azobisisobutyronitrile was added into 2,000 mL of 0.1% aqueous polyvinyl alcohol solution, and the mixture was stirred so that the oil droplet size was 60 μm. Thereafter, a polymerization reaction was carried out at 70° C. for 6 hours. The reaction product was cooled, and copolymer particles thus produced were then taken by filtration, and washed by water and then methanol. Then, the particles were air-dried for a day, and then classified to obtain 85 g of polymer porous support of 45 to 90 μm. The specific surface area, pore volume and average pore size of this polymer porous support were 240 $m^2/g$, 0.62 mL/g and 11.2 nm, respectively. 40 g of polyethyleneimine same as that in example 1 was dissolved in a solution prepared by mixing 40 mL of isopropyl alcohol and 160 mL of water, 20 g of obtained polymer porous support was added, and the mixture was reacted at 50° C. for 6 hours. The reaction product was filtered, and washed with water, methanol and then water to obtain a porous support with which polyethyleneimine was reacted. The amount of nitrogen of the polymer porous support immobilizing polyethyleneimine was measured by an elemental analyzer (2400 Series II CHNS/O Elemental Analyzer manufactured by PerkinElmer Inc.) and found to be 7.88%-N/g. 13 g (equivalent to one times (as mole) based on the amount of nitrogen introduced) of sodium chloroacetate was dissolved in 200 mL of 2 M aqueous sodium hydroxide solution, 20 g of the above polymer porous support immobilizing polyethyleneimine was added, and the mixture was reacted at 40° C. for 6 hours to carry out N-carboxy-methylation. After completion of the reaction, the reaction product was filtered, sufficiently washed with water, then substituted with methanol, and dried to produce a porous metal adsorbent C. The copper adsorption capacity in the porous metal adsorbent C was 0.44 mmol Cu/g.

Metal Adsorption Test 2

Comparison of Metal Adsorption Characteristics

Figure 1B:
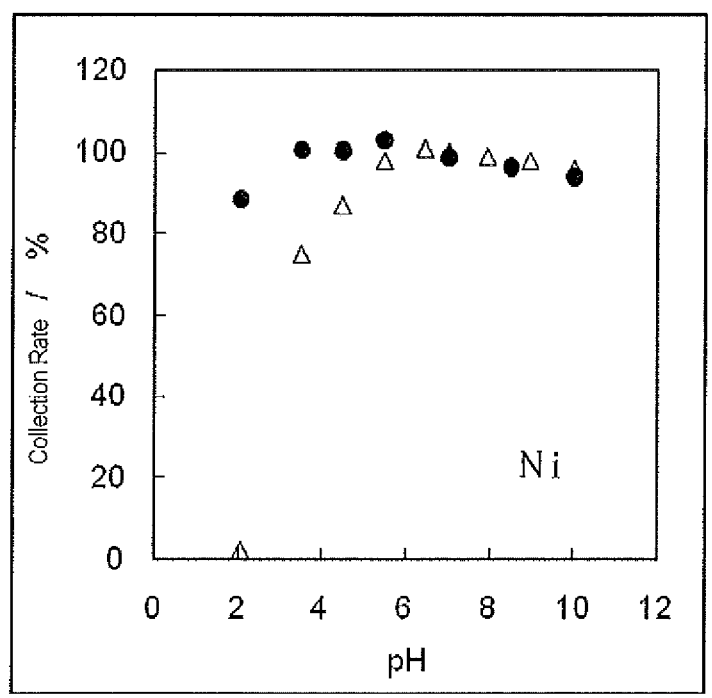
FIG. 1b shows a comparison of adsorption characteristics for nickel Ni at each pH.
Figure 1C:
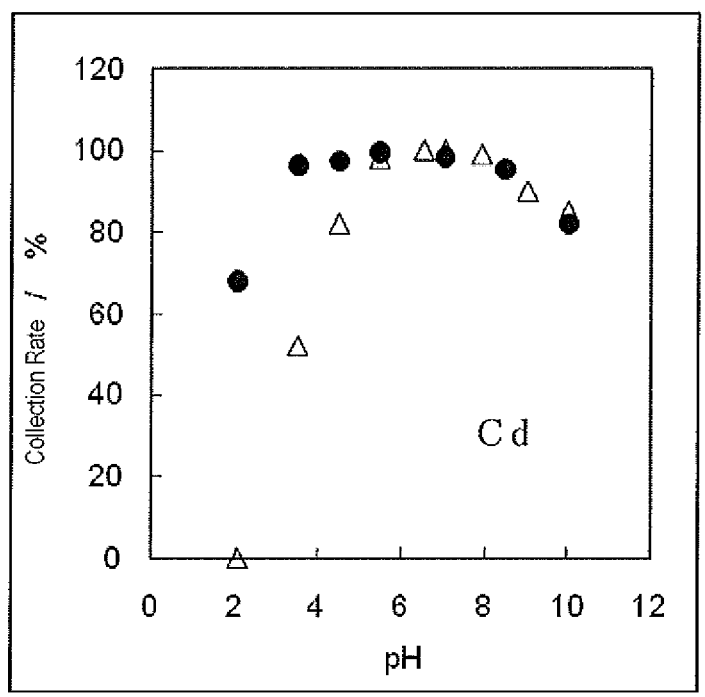
FIG. 1c shows a comparison of adsorption characteristics for cadmium Cd at each pH.
Figure 1D:
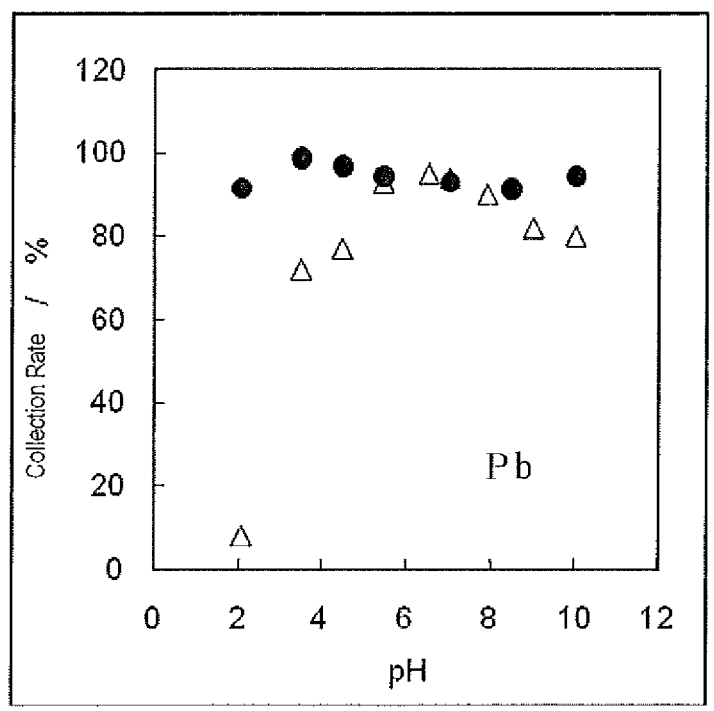
FIG. 1d shows a comparison of adsorption characteristics for lead Pb at each pH.
Figure 1E:
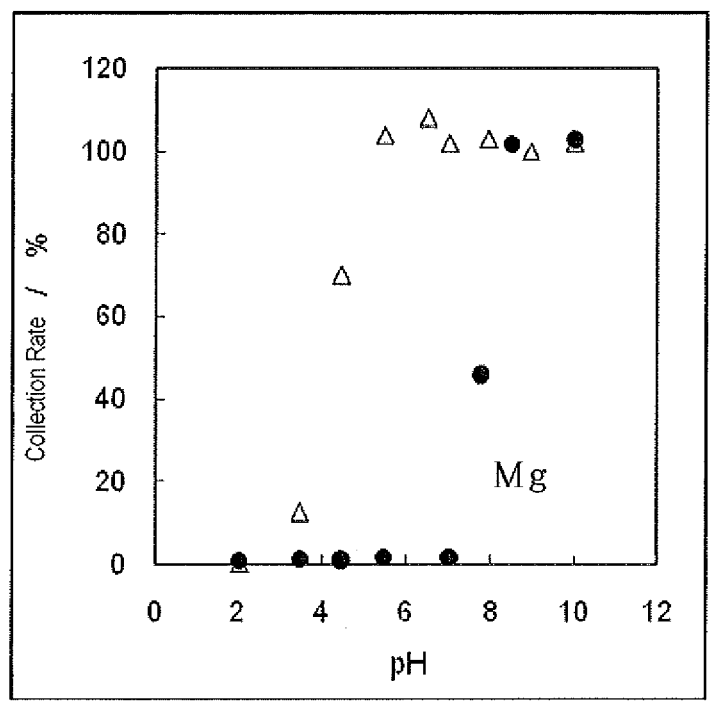
FIG. 1e shows a comparison of adsorption characteristics for magnesium Mg at each pH.
Figure 1F:
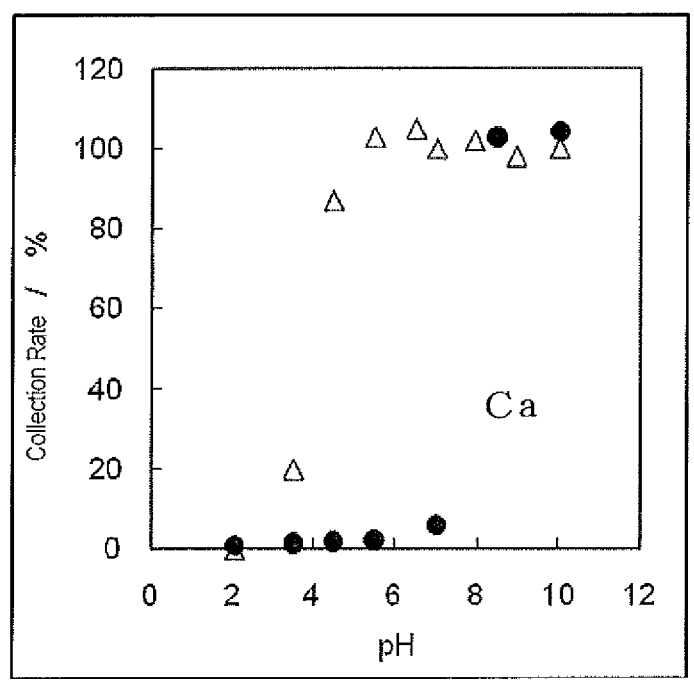
FIG. 1f shows a comparison of adsorption characteristics for calcium Ca at each pH.
Figure 1G:
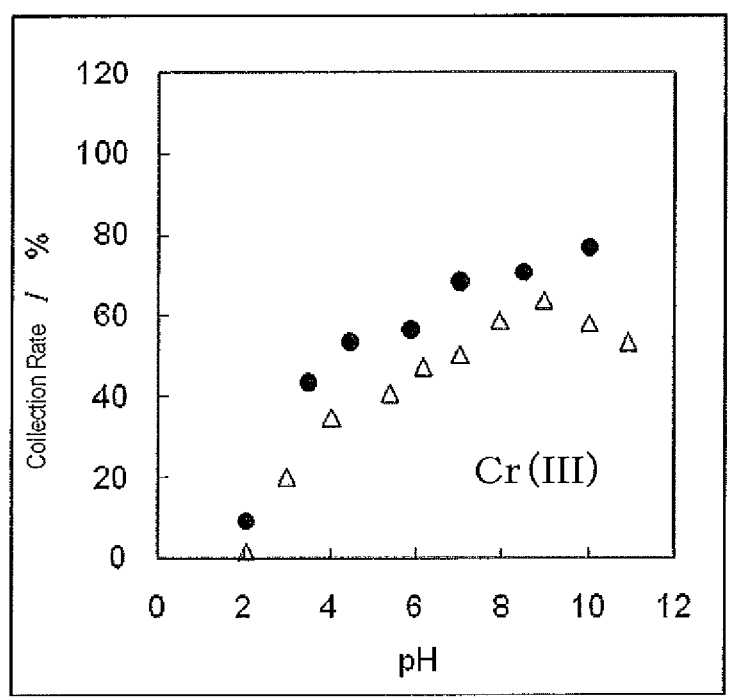
FIG. 1g shows a comparison of adsorption characteristics for trivalent chromium Cr (III) at each pH.
Figure 1H:
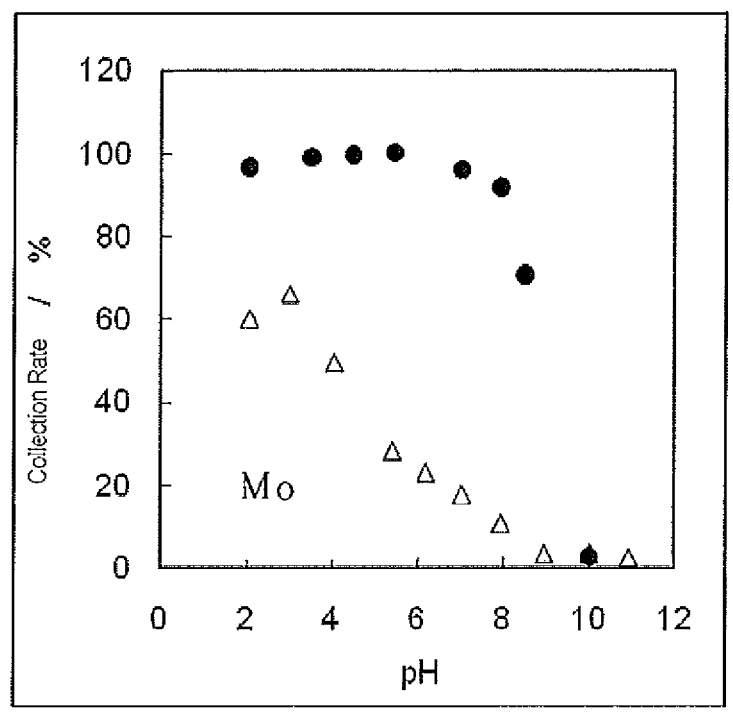
FIG. 1h shows a comparison of adsorption characteristics for molybdenum Mo at each pH.
Figure 1I:
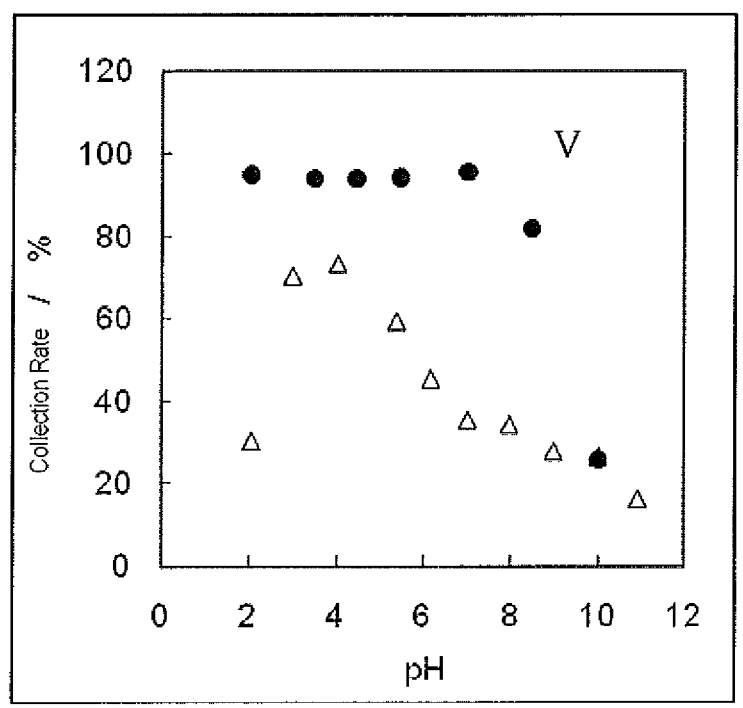
FIG. 1i shows a comparison of adsorption characteristics for vanadium V at each pH.
Figure 1J:
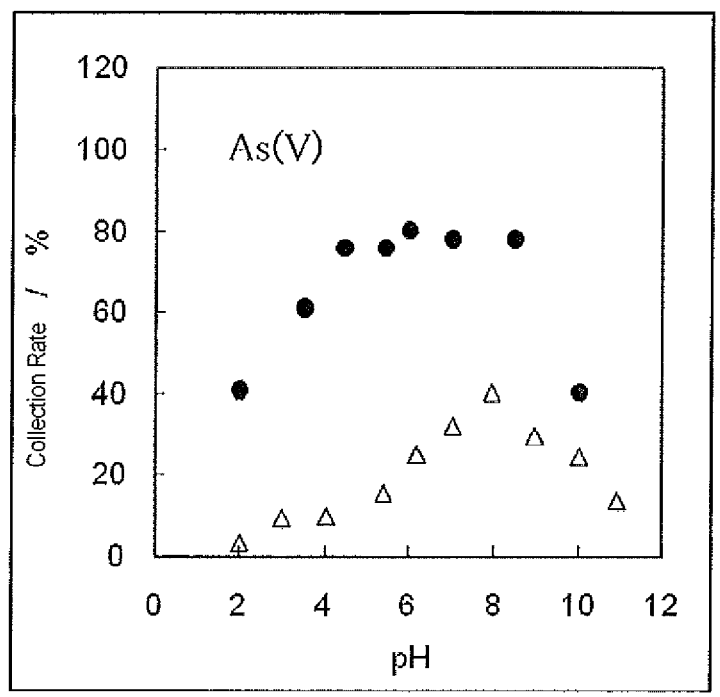
FIG. 1j shows a comparison of adsorption characteristics for pentavalent arsenic As (V) at each pH.

The porous metal adsorbent C obtained in example 3 was filled in a syringe type reservoir in a same manner as in the metal adsorption test 1 and conditioned in the same way. Thereafter, metal mixture standard solutions (copper Cu, nickel Ni, cadmium Cd, lead Pb, magnesium Mg, calcium Ca, trivalent chrome Cr (III), molybdenum Mo, vanadium V, pentavalent arsenic As (V), each 0.1 ppm) adjusted to various pHs were passed through the reservoir to adsorb metals. The adsorbed metal was eluted with 3 mL of 3 M nitric acid, and the concentration of the metal in solution was measured using an ICP emission analyzer (Optima 3000 DV manufactured by PerkinElmer Inc.) to determine an adsorption/collection rate. For comparison, Chelex 100 (manufactured by Bio-Rad Laboratories, Inc., exchange capacity: 0.4 meq/mL), a commercially available IDA type chelating resin was used to conduct a similar metal adsorption characteristic test. The results are shown in FIG. 1. As shown in FIG. 1, the adsorption/collection rate for heavy metals such as copper, nickel, cadmium and lead under acidic conditions was considerably improved as compared to the IDA type. Furthermore, with the porous metal adsorbent C, alkali earth metals were not adsorbed at all at pH of 7 or lower, and heavy metals could be adsorbed and collected to a high degree without being interfered by alkali earth metals. Moreover, the metal adsorbent C exhibited a high adsorption/collection rate for chromium, molybdenum, vanadium and arsenic in the entire pH range.

Example 4

Production of Fiber-Type Metal Adsorbent D 125 g of polyethyleneimine (manufactured by Wako Pure Chemical Industries, Ltd.) having an average molecular weight of 10,000 was added into a 1 M aqueous sodium hydroxide solution having dissolved therein 1 times (as mole) of sodium chloroacetate (340 g) based on the nitrogen content, and N-carboxy-methylation was carried out with stirring at 60° C. for 6 hours. To the resulting reaction mixture was added methanol to precipitate the produced partially carboxy-methylated polyethyleneimine, and the supernatant was removed. A 0.1 M aqueous sodium hydroxide solution was added to the precipitated partially carboxy-methylated polyethyleneimine and dissolved therein, methanol was then added to precipitate partially carboxy-methylated polyethyleneimine again, and the supernatant was removed. The same operations were repeated twice. Then, the partially carboxy-methylated polyethyleneimine was dissolved in a 0.1 M aqueous sodium hydroxide solution to form aqueous alkali solution at a concentration of about 20% by weight. 300 mL of the aqueous alkali solution (concentration of about 20% by weight) was added and mixed into 500 mL of cellulose viscose (cellulose concentration: 8.8%) obtained by a well-known method, and the mixture was degassed under a reduced pressure, followed by wet blend-spinning by a well-known viscose method to obtain a fiber-type metal adsorbent of 2.0 dtex. The obtained metal adsorbent was cut to form a short fiber-type metal adsorbent D having a length of 51 mm. The nitrogen content in the fiber-type metal adsorbent was measured by an elemental analyzer and found to be 1.62 N %. The polyamine polymer is partially carboxy-methylated, and therefore it is difficult to determine its absolute amount from this value, but this result indicates that the polyamine polymer is contained as polyethyleneimine in cellulose in an amount of approximately 4.98%.

Example 5

Production of Fiber-Type Metal Adsorbent E 1,000 g of polyethyleneimine (manufactured by Wako Pure Chemical Industries, Ltd., 30% aqueous solution) having an average molecular weight of 70,000 was added into 1 M aqueous sodium hydroxide solution having dissolved therein 0.3 times (as mole) of sodium chloroacetate (813 g) based on the nitrogen content in polyethyleneimine, and N-carboxy-methylation of polyethyleneimine was carried out with stirring at 60° C. for 6 hours. After completion of the reaction, the concentration of the reaction mixture was adjusted to obtain an aqueous alkali solution of partially carboxy-methylated polyethyleneimine at a concentration of 15% by weight as polyethyleneimine. 600 mL of the aqueous alkali solution of partially carboxy-methylated polyethyleneimine (concentration of 15% by weight) was blended into viscose in a manner same as that in example 4 to obtain a fiber-type metal adsorbent E. The nitrogen content in the metal adsorbent was measured by an elemental analyzer and found to be 2.39 N %, which indicates that the polyamine polymer was contained as polyethyleneimine in cellulose in an amount of 7.34%.

Metal Adsorption Test 3

Performance of Metal Adsorption Capacity

The fiber-type metal adsorbents obtained in example 4 and example 5 were tested in a manner same as that in metal adsorption test 1 to determine copper adsorption capacity in the metal adsorbents. The results are shown in table 2. The fiber-type metal adsorbents D and E having the polyamine polymer of the present invention as a chelating functional group had sufficient performance of metal adsorption capacities.

TABLE 2

Comparison of metal adsorption capacity of fiber-type metal adsorbents

| Fiber-type adsorbent | Example 4 Fiber-type metal adsorbent D | Example 5 Fiber-type metal adsorbent E |
|---|---|---|
| Nitrogen content [N %] | 1.62 | 2.39 |
| Metal adsorption capacity [mmol Cu/g] | 0.34 | 0.51 |

Metal Adsorption Test 4

Evaluation of Metal Adsorption Characteristics

Figure 2A:
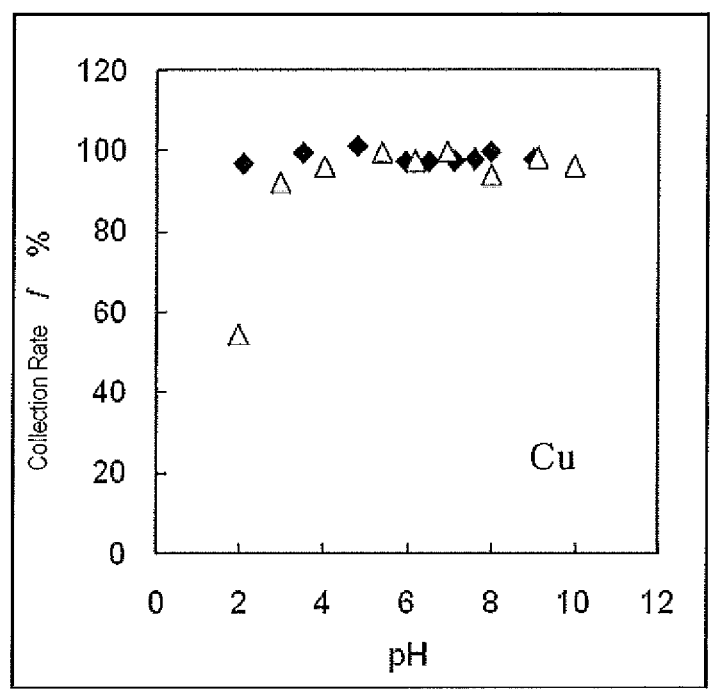
FIG. 2a shows a comparison of adsorption characteristics for copper Cu at each pH.
Figure 2B:
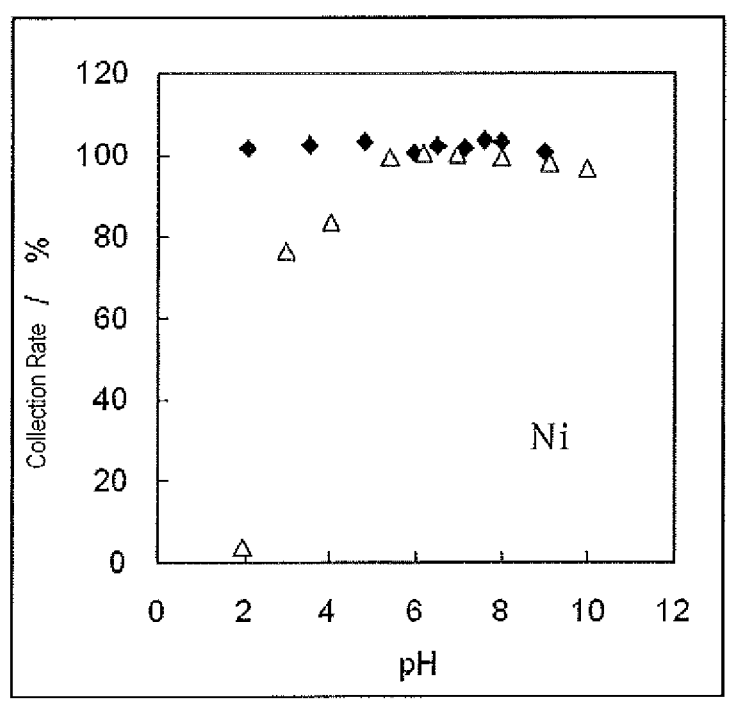
FIG. 2b shows a comparison of adsorption characteristics for nickel Ni at each pH.
Figure 2C:
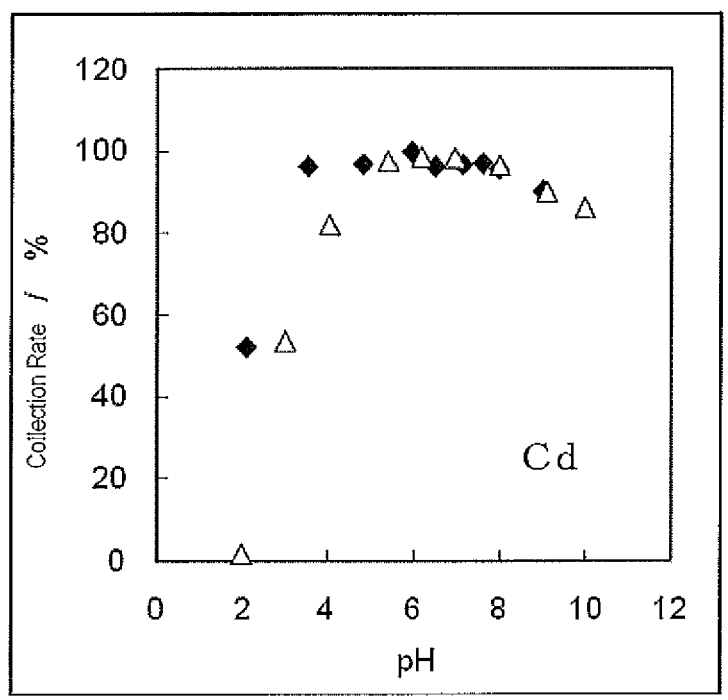
FIG. 2c shows a comparison of adsorption characteristics for cadmium Cd at each pH.
Figure 2D:
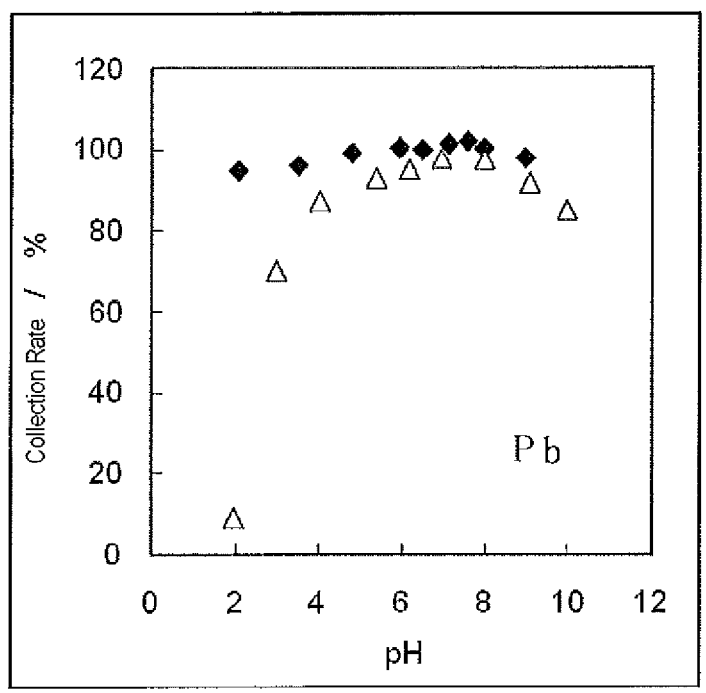
FIG. 2d shows a comparison of adsorption characteristics for lead Pb at each pH.
Figure 2E:
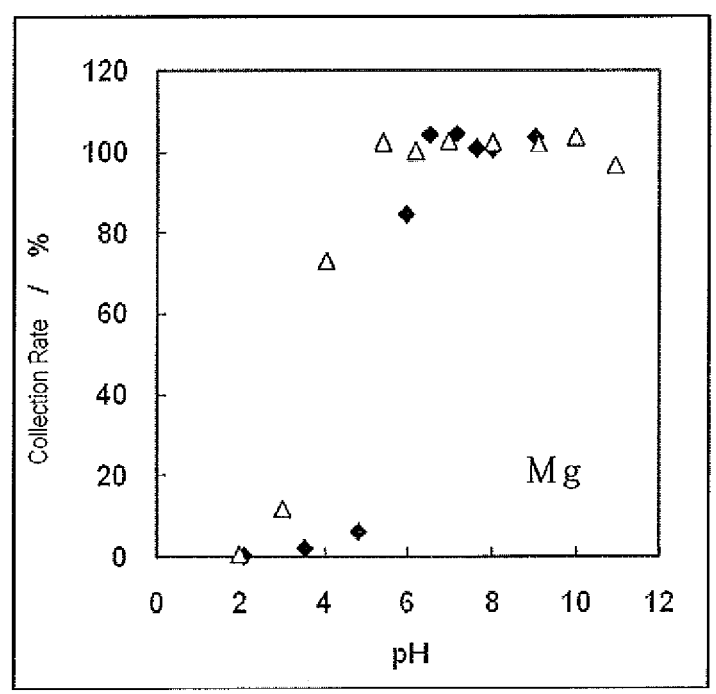
FIG. 2e shows a comparison of adsorption characteristics for magnesium Mg at each pH.
Figure 2F:
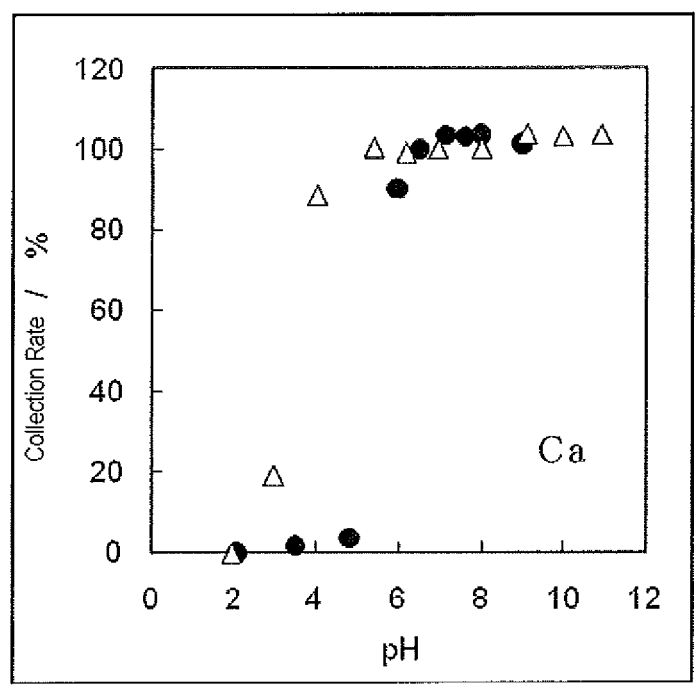
FIG. 2f shows a comparison of adsorption characteristics for calcium Ca at each pH.
Figure 2G:
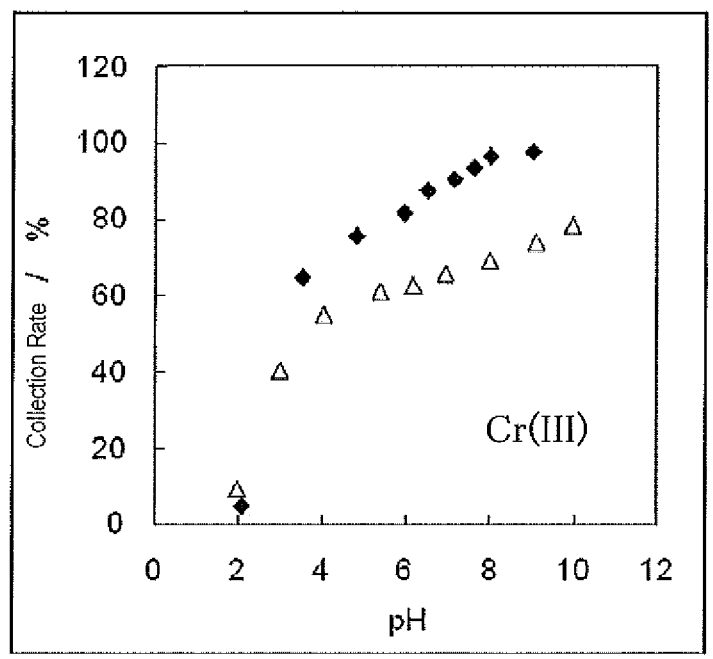
FIG. 2g shows a comparison of adsorption characteristics for trivalent chromium Cr (III) at each pH.
Figure 2H:
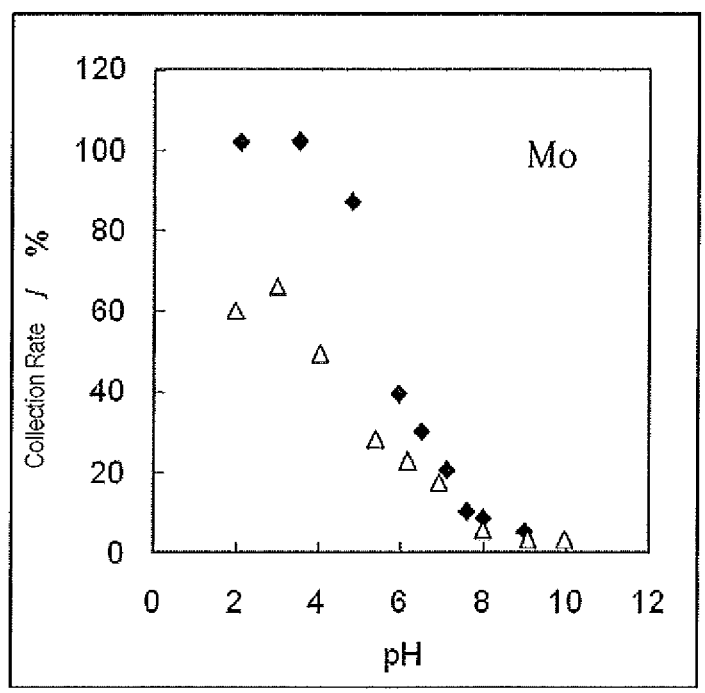
FIG. 2h shows a comparison of adsorption characteristics for molybdenum Mo at each pH.
Figure 2I:
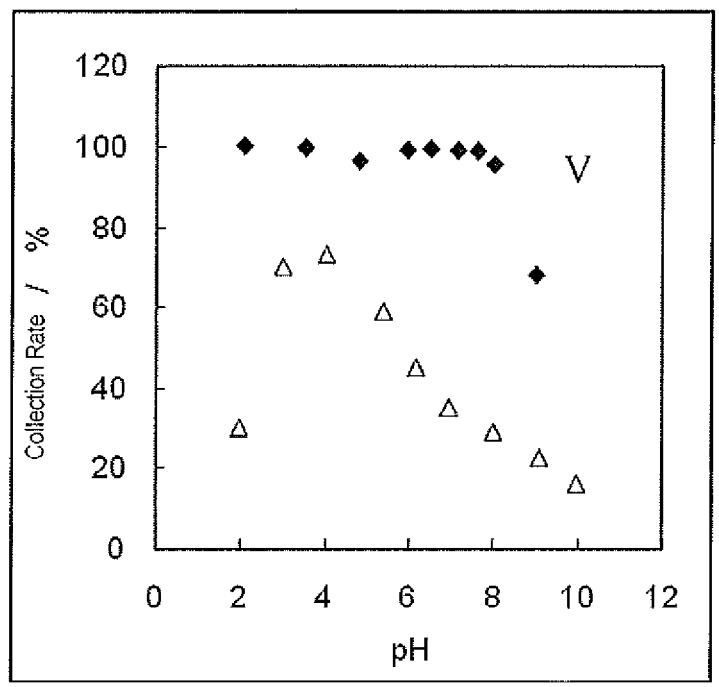
FIG. 2i shows a comparison of adsorption characteristics for vanadium V at each pH.
Figure 2J:
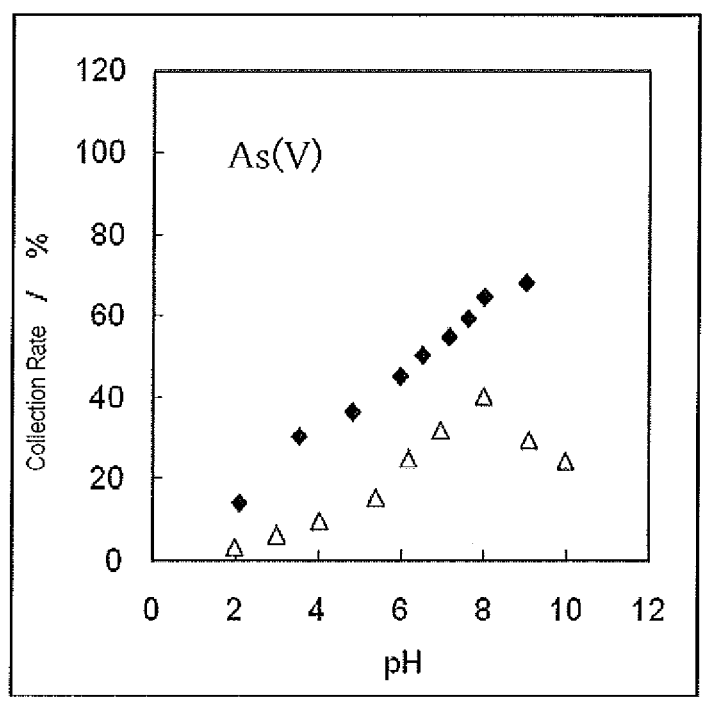
FIG. 2j shows a comparison of adsorption characteristics for pentavalent arsenic As (V) at each pH.

The fiber-type metal adsorbent D produced in example 4 and a commercially available iminodiacetic acid type chelating resin were used to test metal adsorption characteristics at various pHs of samples in accordance with metal adsorption test 2. 0.25 g of each of the fiber-type metal adsorbent D and the commercially available iminodiacetic acid type chelating resin were used to examine the adsorption/collection rate in a manner same as that in metal adsorption test 2. The results are shown in FIG. 2. As shown in FIG. 2, the adsorption/collection rate for heavy metals such as copper, nickel, cadmium and lead under acidic conditions was considerably improved as compared to the IDA type. Furthermore, with the fiber-type metal adsorbent D, alkali earth metals were not adsorbed at all at pH of 5 or lower, and heavy metals could be adsorbed and collected to a high degree without being interfered by alkali earth metals. Moreover, the metal adsorbent D exhibited a high adsorption/collection rate for chromium, molybdenum, vanadium and arsenic over the entire pH range.

INDUSTRIAL APPLICABILITY

According to the present invention, a metal adsorbent having a high metal adsorption ability can be produced by using a) a method in which a specific polyamine polymer of the present invention is reacted with a porous support having a functional group reactive with an imino group and immobilized on the porous support, b) a method in which a specific polyamine polymer is blended into a solution of a raw material for fibers and the mixture is formed into fibers by blend-spinning by wet spinning or dry spinning, and c) a method in which a specific polyamine polymer is dissolved into a film-forming polymer solution and the mixture is formed into a film using a method of film formation from solution. These metal adsorbents can adsorb heavy metals over a wide pH range to a high degree, thus making it possible to remove heavy metals in wastewater and service water, collect valuable metals from environmental water and metal treating solutions and remove hazardous metals from food products and drinking water. Furthermore, the metal adsorbent of the present invention has a variety of forms, and can conform to a wide variety of needs and installation environment.

DESCRIPTION OF SYMBOLS

●: metal adsorption/collection rate in porous metal adsorbent C of example 3
♦: metal adsorption/collection rate in fiber-type metal adsorbent D of example 4
Δ: metal adsorption/collection rate in commercially available iminodiacetic acid type chelating resin

The invention claimed is:

1. A metal adsorbent fiber comprising a polyamine polymer which has repeating units of ethyleneimine and N-carboxy-methylated ethyleneimine represented by the following formula (1) and in which the average molecular weight of polyethyleneimine forming a chain frame is 600 to 150,000

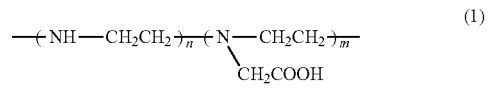

(1)

wherein n represents a positive integer and m represents a positive integer; the polyamine polymer being incorporated into a cellulose fiber by incorporating the polyamine polymer into a solution of a raw material for the cellulose fiber to form a spinning solution and forming the spinning solution into a fiber by wet blend-spinning.

2. The metal adsorbent fiber according to claim 1, characterized in that an amount of the polyamine polymer blended into the raw material for the cellulose is 1-30 weight percent.

* * * * *